Dec. 9, 1958  YORIMASA MURATA  2,863,672
METHOD AND DEVICES OF HORIZONTAL ABSORBING OF SHOCK ON VEHICLES
Filed May 23, 1956  3 Sheets-Sheet 1

YORIMASA MURATA
INVENTOR.

BY

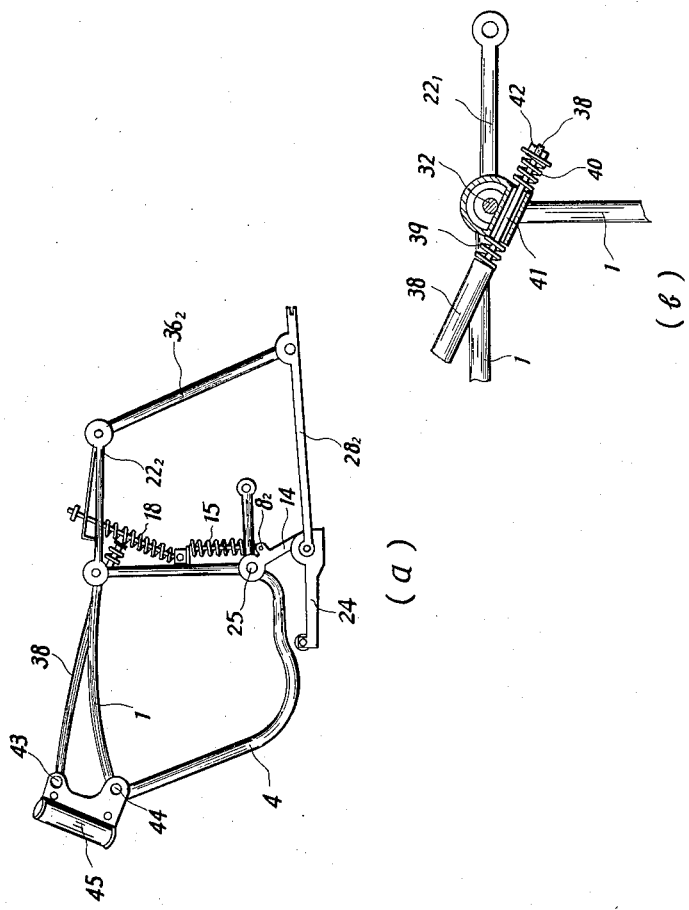

2,863,672

METHOD AND DEVICES OF HORIZONTAL ABSORBING OF SHOCK ON VEHICLES

Yorimasa Murata, Tottori-shi, Tottori, Japan

Application May 23, 1956, Serial No. 586,879

Claims priority, application Japan February 10, 1956

8 Claims. (Cl. 280—283)

The present invention relates generally to an apparatus for absorbing horizontal shocks on any vehicle, particularly on a cycle with or without a prime mover, which shocks are applied externally when it is running on the road or on rails.

The object of the invention resides in the provision of devices for absorbing vibrations caused by external shocks by diverging them separately in horizontal directions, giving no uncomfortable vibration to persons on the cycle and preventing the cycle from being damaged in its use.

Since the shock absorbing devices hitherto in use are made for the purpose of absorbing mainly vertical vibrations, all shocks given in horizontal directions must be absorbed after changing them into vertical vibrations. For instance, in case of shocks resulting from emergency stops, rugged roads, joints of rail or obstacles on the road such as pebbles, on cycle wheels, even if they are acting in horizontal direction against horizontal inertia of the running vehicle, are absorbed unreasonably by change into vertical vibrations, which will cause damage of the cycle, adversely affecting on the health of persons on the cycle, resulting in an unstable state of centre of gravity, and increasing the danger in operating the cycle.

The present invention eliminates such defects and disadvantages as above mentioned.

According to the invention, each wheel is provided with a horizontal shock absorber respectively, possibly diverging external shocks into small parts and absorbing them in partial vibration, thus avoiding massive, concentrated vibrations on the cycle and absorbing shocks on the car in a horizontal direction as much as possible and preventing vibration in vertical directions.

Horizontal shock absorbers in accordance with the invention utilize conventional coil springs, hydraulic and pneumatic mechanisms etc., corresponding to the kinds, dimensions, weights and speed etc. of the vehicles in question.

The accompanying drawings show some examples of shock absorbers in which spring coils are used for shock absorbing parts according to the method of the present invention.

Figure 1:
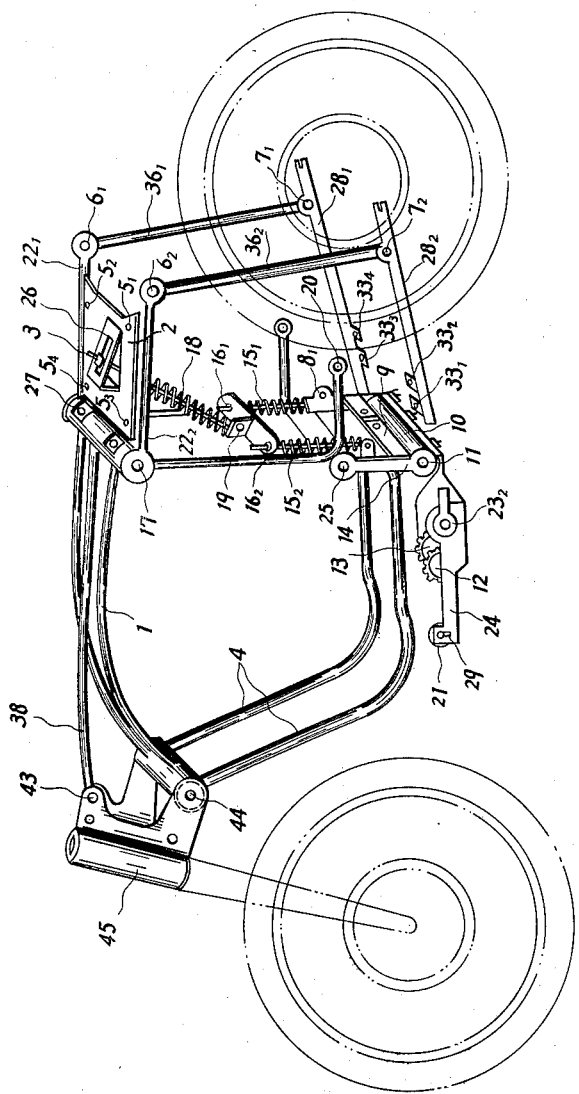
Figure 2:
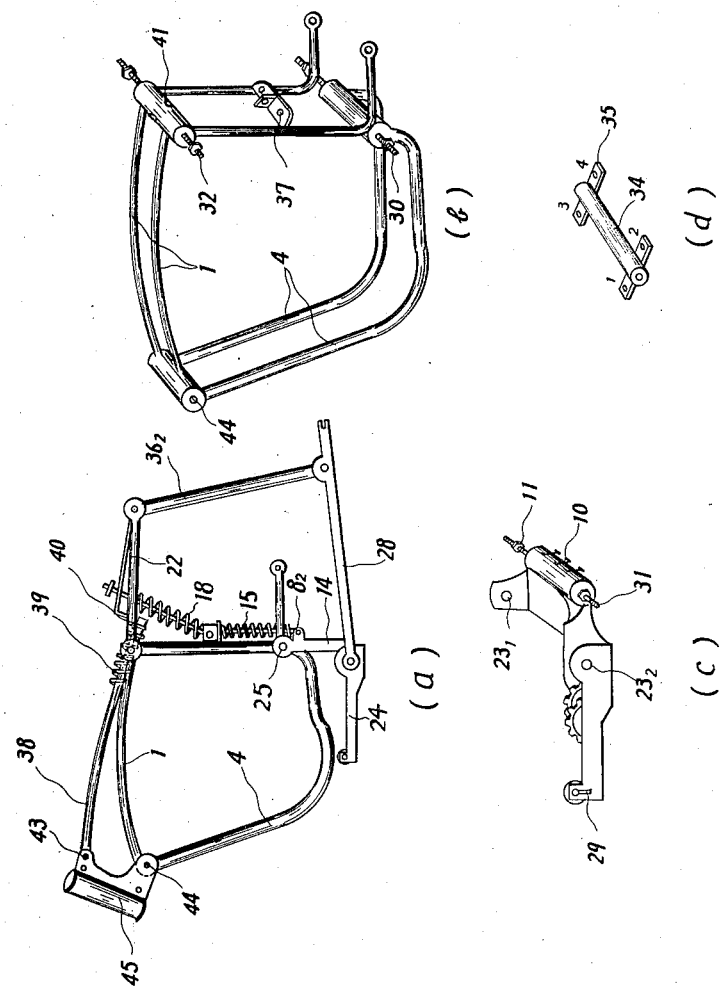

Fig. 1 is an elevational view of the horizontal shock absorber applied to a two-wheel cycle, in which absorbing parts to be equipped on each wheel are put together on the middle part of the vehicle from viewpoints of construction and appearance;

Figs. 2($a$), ($b$), ($c$), and ($d$) are explanatory sketches of the main parts of the construction shown in Fig. 1; and Figs. 3($a$) and 3($b$) are partial elevational views of parts of the shock absorber having in Fig. 3($a$) various parts in shock absorbing position.

In the above drawings, 1 is a main frame, 2 is the bearing plate for the vertical shock absorbing spring, 3 is the guide rod for the vertical shock absorbing spring 18, 4 is the front frame, $5_1$, $5_2$, $5_3$, $5_4$ are fixing nuts for bearing plate 2, $6_1$, $6_2$ are upper pivot joints for the rear frame, $7_1$, $7_2$ are lower pivot joints for the rear frame, $8_1$, $8_2$ are pivot joints for horizontal shock absorbing springs $15_1$, $15_2$, 9 is the joint plate for horizontal shifting crank lever 14, 10 is the engaging part for sliding shoes 24, 11 is the pivot joint of sliding shoes, 12 is the driving gear, 13 is the transmission gear. There are two horizontal shifting crank levers 14, one of which is shown in the drawing. The numerals $15_1$, $15_2$ are horizontal shock absorbing springs disposed vertically, $16_1$, $16_2$ are guide rods for horizontal shock absorbing springs, 17 is the pivot joint for frames $22_1$, $22_2$, 18 is a vertical shock absorbing spring disposed diagonally, 19 is the pivot joint for spring 18, 19 is the pivot joint for spring 18, 20 is the fitting hole for the cargo supporting frame, 21 is the roller bearing, $22_1$, $22_2$ are working frames with a vertical shock absorbing spring, $23_1$, $23_2$ are pivot joints for sliding shoes 24 and for lower rear frame $28_2$, 29 is the adjusting slot for roller bearing 21, 30 is the stepped spindle (with nut) for lower pivot joint of the main frame, 31 is the stepped spindle (with nut) for the pivot joint of sliding shoes, 32 is the stepped spindle (with nut) for the upper pivot joint of the main frame, $33_1$, $33_2$, $33_3$, $33_4$ are fixing holes for the lower rear frame, 34 is a brake case, 35 is the fixing piece of the brake case for the lower rear frame, $36_1$, $36_2$ are vertical rear frames, 37 is a supporting piece of the guide rod for the horizontal shock absorbing spring, 38 is the cushion rod for the front wheel, 39, 40 are springs, 41 is a penetrating pipe, 42 is the adjusting nut, 43 is the pivot joint of cushion rod 38, 44 is the joint piece for the front frame, 45 is the inserting part for the front wheel fork rod.

The horizontal shock absorber of the present example is constructed with above mentioned parts as follows:

In the above drawings, a stepped spindle 32 is secured to the main frame 1 as by fasteners 27. The fasteners 27 are not shown in Fig. 2($b$) for purposes of clarity. Two frames $22_1$, $22_2$ are pivoted to both sides of joint 17 on main frame 1 by means of the stepped spindle 32, to which bearing plate 2 is engaged by fixing nuts $5_1$, $5_2$, $5_3$, $5_4$ and said rods $22_1$ and $22_2$ are made to move as one body. One end of vertical shock absorbing spring 18 is pivoted to joint 19 on the main frame 1 and another end of the spring 18 is fixed to rod 3, which is set by a nut through slot 26 for shifting and adjusting of the spring.

Crank levers 14 for horizontal shifting are pivoted to both sides of joint 25 on the main frame 1 by means of stepped spindle 30 with nuts at the lower part of the frame, and are fixed by a joint plate 9, being made to move on one body. On both sides of pivot joint 11 of sliding shoes 24, levers 14 are fixed by stepped spindle 31 with nuts and two lower rear frames $28_1$, $28_2$ are pivoted to joints $23_1$, $23_2$ of sliding shoes 24, and engaging pieces 35 of brake case 34 are fixed to holes $33_1$, $33_2$, $33_3$, $33_4$ of the lower rear frames, respectively, making the two frames $28_1$, $28_2$ to one body.

The lower ends of vertical rear frames $36_1$, $36_2$ are pivoted to joint $7_1$, $7_2$ of lower rear frames $28_1$, $28_2$ and their upper ends are pivoted to joint $6_1$, $6_2$ of upper rear frames $22_1$, $22_2$. Sliding shoe 24 is provided with rear wheel driving gear 12 and transmission gear 13, having an adjusting slot 29 for roller bearing 21 at its front end. The bearing 21 fitted to the slot 29 may slide in close contact with front frame 4, the radius of curvature of which being equal to the swing radius of crank lever 14 for horizontal shifting.

Guide rods $16_1$, $16_2$ are pivoted to joints $8_1$, $8_2$ on projections of the crank lever 14 through horizontal shock absorbing springs $15_1$, $15_2$ and through holes on the supporting piece 37 which is fixed to the main frame 1.

The upper ends of guide rods $16_1$, $16_2$ are pressed to the piece 37 with nuts to adjust the elasticity of springs $15_1$, $15_2$.

A front wheel is engaged to the front of main frame 1 through conventional fork, and axle of rear wheel is engaged to inserting grooves on the rear end of frame $28_1$, $28_2$.

On the upper portion of the inserting part 45, as seen best in Figs. 2(a), 3(a), and 3(b) and not shown in Fig. 1 for purposes of clarity, there is pivoted an end of cushion rod 38 at 43 and its other end is passed through a penetrating pipe 41 which is fixed to a covering case of the stepped spindle 32. On both sides of the pipe 41 there are inserted springs 39, 40 which are pressed by an adjusting nut 42 at rear end of the cushion rod 38, as shown in Fig. 3(b).

The shock absorbing device of the above example is so constructed that a deformable link rear frame is pivoted to a rigid link frame and shock absorbing parts are equipped between these two frames, and thus horizontal shock is divided into parts and absorbed separately, that is, most part is absorbed by springs $15_1$, $15_2$ and the small part is absorbed by springs 39, 40, and the remaining very small part (vertical vibration only) is absorbed by spring 18.

When the rear wheel is braked by an emergency stop, the levers 14 swing backward around the pivot 25, the shoes 24 slide backward along the curvature of frame 4, compressing the springs $15_1$, $15_2$ and deforming the link combination of rear frames (Fig. 3(a)). Then these displacement and deformation are promptly restored by the elasticity of the springs $15_1$, $15_2$.

Those shocks given by rugged road, pebbles thereon, etc., which are comparatively small of resistance may be absorbed by the springs 39, 40.

Those shocks given by rugged road, pebbles thereon, etc., which are comparatively small of resistance may be absorbed by the springs 39, 40.

Thus any shock during the running of the vehicle is almost entirely absorbed by the horizontal shock absorbing springs $15_1$, $15_2$ and 39, 40, and the accompanying small vertical vibration is absorbed by the spring 18, so that any vibration caused by shocks is not in the least transmitted to the main frame 1 and the bearing plate 2, ensuring therefore a safe and comportable driving without vertical vibrations.

As above mentioned, it is possible to minimize vertical vibrations of running vehicles according to the method of the present invention so that various advantages will result therefrom, as for instance:

(1) Shocks given to the rider will be considerably decreased;

(2) Dimension, weight and strength of construction elements of vehicle body, wheel, etc., can be decreased considerably;

(3) Durability of the vehicle will be increased many times over that of conventional type;

(4) The pneumatic tires used on the vehicle can be filled at optimum pressure for most advantageous and convenient use;

(5) In case of emergency stops or rugged roads, etc., skidding of the vehicle is avoided;

(6) Damage to the vehicle caused by rough roads will be considerably decreased.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a two-wheel cycle provided with a front wheel suspension member and a rear wheel cargo supporting suspension member; a rigid main frame having a forward portion and a rearward portion, said forward portion of the rigid frame being pivotally secured to said front wheel suspension member, a flexible link rearward frame pivotably secured to said rearward portion of said rigid main frame and to said rear wheel suspension member, shock absorbing means extending from said rigid main frame to said deformable link rearward frame, said shock absorbing means further comprising first means for absorbing substantially horizontal shocks and second means for absorbing substantially vertical shocks relative to the plane of travel of said cycle, said rigid main frame further including a first horizontally disposed spindle pivotally secured to said front wheel suspension member, a first pair of substantially horizontal spaced bars having their forward ends secured to said first spindle, a second, horizontally disposed spindle secured to the rearward ends of said horizontal spaced bars, a second pair of substantially vertically spaced bars secured at their upper ends to said second spindle, a third, horizontally disposed spindle secured to the lower ends of said second pair of bars, and a third pair of curved spaced bars connecting said first spindle and said third spindle, said flexible link rear frame being pivotally secured to said second and third spindles.

2. In a two-wheel cycle according to claim 1, said flexible link rear frame further comprising a first pair of substantially horizontal spaced link rods secured with their forward ends to said second spindle, a second pair of substantially vertical spaced link rods, each of said second pair of link rods being pivotally secured at its upper end to the rearward end of each of said first pair of link rods respectively, a pair of substantially vertical spaced crank levers, each said crank lever being pivotally secured with its upper end to said third spindle, a pair of substantially horizontal rear wheel support members, each said member being pivotally secured at its forward end to the lower end of each of said crank levers, and pivotable at its rearward end to the lower end of each of said second pair of link rods, whereby when external shocks are applied to said front and rear wheel suspension members, said flexible link rearward frame is distorted from its normal shape by the shocks, and is returned to its normal shape by said shock absorbing means.

3. In a two-wheel cycle according to claim 2, said first means for absorbing substantially horizontal shocks further comprising a plate transversely secured to said second pair of vertically disposed first bars, and spring means secured to said plate and to each of said crank members, whereby said crank members are normally maintained in a substantially vertical position.

4. In a two-wheel cycle according to claim 3, said plate transversely secured to said second pair of bars having a pair of spaced holes therein, a pair of spring-bearing rods, each rod being pivotally secured at one of its ends to each of said cranks and having its other end extending through each of said holes in said plate, respectively, a pair of compression springs on each of said rods, respectively, disposed between said plate and said crank members, and means securing each of the other ends of said rods to said plate.

5. In a two-wheel cycle according to claim 4, said flexible link rearward frame further comprising a sliding shoe having its one end pivotally secured to the lower end of one of said crank members and a roller being pivotally secured on its other end, said roller slidably engaging one of said third pair of curved bars.

6. In a two-wheel cycle according to claim 5, said crank member having a radius equal to the radius of each of said third pair of curved bars.

7. In a two-wheel cycle according to claim 6, said second means for absorbing substantially vertical shocks, comprising spring means biased with respect to said second pair of vertical spaced bars, and fastening means for securing said spring means to said second pair of bars and to said first pair of horizontal link rods.

8. In a two-wheel cycle according to claim 7, said first means for absorbing substantially horizontal shocks further comprising a cushion rod having one of its ends pivotable on the front wheel suspension member and the other of its ends slidingly engaging with said second spindle, and spring means connected with said cushion rod, said spring means being compressible by the impact of horizontal shocks.

References Cited in the file of this patent

UNITED STATES PATENTS

| | | |
|---|---|---|
| 1,199,322 | Trott | Sept. 26, 1916 |
| 1,283,030 | Ashton | Oct. 29, 1918 |
| 2,266,752 | Gottfried | Dec. 23, 1941 |
| 2,338,478 | Wulff | Jan. 4, 1944 |

FOREIGN PATENTS

| | | |
|---|---|---|
| 599,041 | France | Oct. 12, 1925 |